United States Patent [19]

Miyanaga et al.

[11] Patent Number: 5,248,357
[45] Date of Patent: Sep. 28, 1993

[54] PROCESS FOR ASSEMBLING A GREEN TIRE

[75] Inventors: Yoshinobu Miyanaga, Akashi; Masao Takami, Kobe; Hisashi Imai, Nishishirakawa; Shinji Hayase, Shirakawa; Koji Soeda, Kobe, all of Japan

[73] Assignee: Sumitomo Rubber Industries Limited, Hyogo, Japan

[21] Appl. No.: 735,814

[22] Filed: Jul. 25, 1991

[30] Foreign Application Priority Data

Jul. 25, 1990 [JP] Japan ................. 2-197385

[51] Int. Cl.⁵ .............................................. B29D 30/30
[52] U.S. Cl. ............................... 156/128.1; 156/133; 152/532
[58] Field of Search .......... 156/121, 123, 128.1, 156/128.6, 133; 152/532, 538

[56] References Cited

U.S. PATENT DOCUMENTS

| | | | |
|---|---|---|---|
| 4,007,069 | 2/1977 | Takayanagi et al. | 156/123 |
| 4,269,646 | 5/1981 | Miller et al. | 156/130 |
| 4,373,566 | 2/1983 | Hirakawa et al. | 152/532 X |
| 4,555,287 | 11/1985 | Goodfellow | 156/127 |
| 4,673,457 | 6/1987 | Goodfellow | 156/415 |
| 4,846,907 | 7/1989 | Kumagai et al. | 156/130 |

FOREIGN PATENT DOCUMENTS

| | | |
|---|---|---|
| 0294484A | 5/1988 | European Pat. Off. |
| 419142A2 | 3/1991 | European Pat. Off. |
| 2548081 | 1/1985 | France |
| 2617087 | 12/1988 | France |
| 2133357A | 7/1984 | United Kingdom |
| 2223988A | 4/1990 | United Kingdom |

*Primary Examiner*—Michael W. Ball
*Assistant Examiner*—Francis J. Lorin
*Attorney, Agent, or Firm*—Birch, Stewart, Kolasch & Birch

[57] ABSTRACT

A green tire building process wherein a cylindrical belt (B) comprising a tread (A) and a breaker (3) are applied around a toroidally shaped tire carcass (1) on a tire carcass building drum (13) to assemble a green tire. The breaker cushions (6) are fit to the inner circumferential surfaces of the opposite edge portions of the breaker (3) prior to applying the belt (B) around the tire carcass (1). The breaker cushions are fit to the breaker by first winding the cushions around axial end portions of a belt forming drum in a manner such that the diameter of the radially inner peripheral surfaces of the breaker cushions decrease in diameter towards the axially outer extremities of the drum and the radially outer surfaces of the cushions are generally flat. Then the breaker and tread are wound onto the breaker cushions to form the belt which is later removed from the belt forming drum before being applied onto the tire carcass.

9 Claims, 6 Drawing Sheets

Fig. 2 (I)
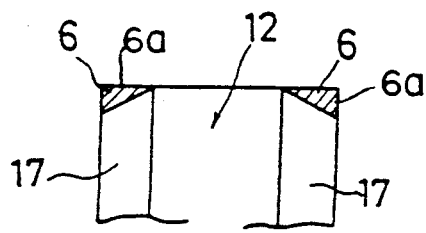
Fig. 2 (II)
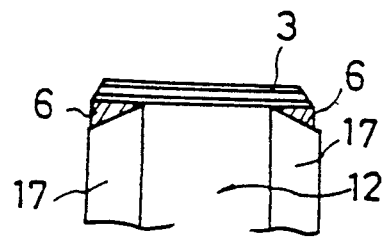
Fig. 2 (III)
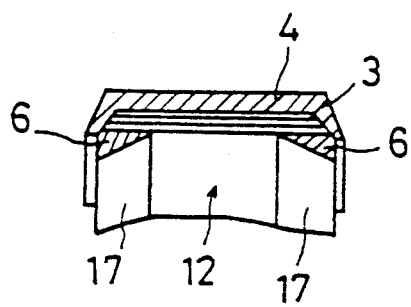
Fig. 2 (IV)
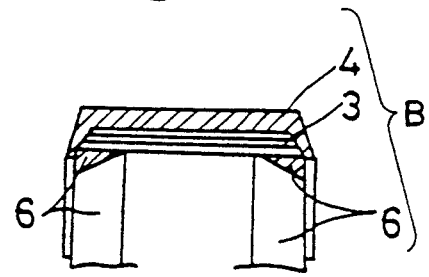
Fig. 6
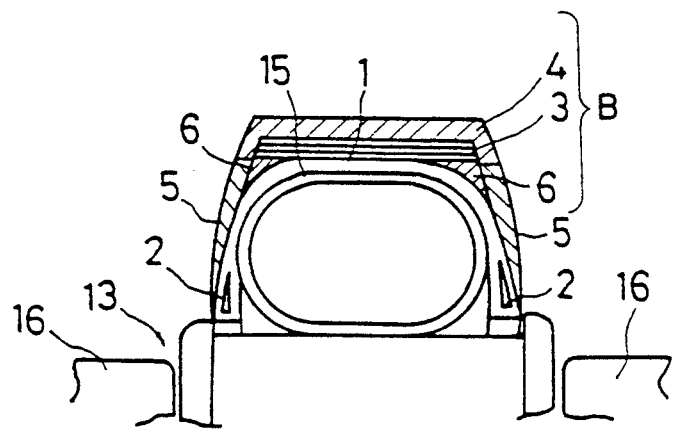

Fig. 3 (I)
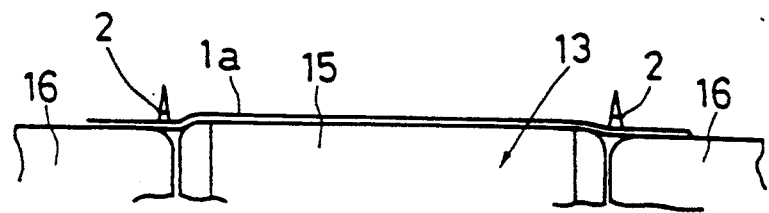
Fig. 3 (II)
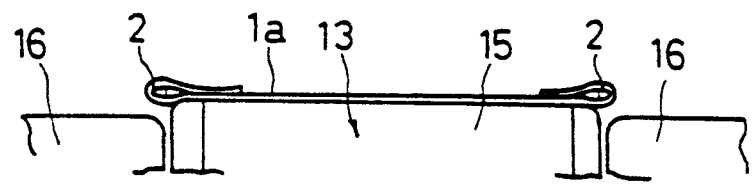
Fig. 3 (III)
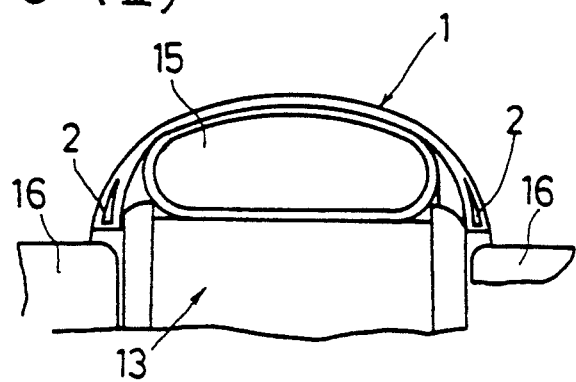

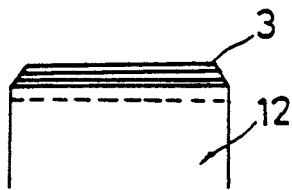
Fig. 9 (I) (PRIOR ART)
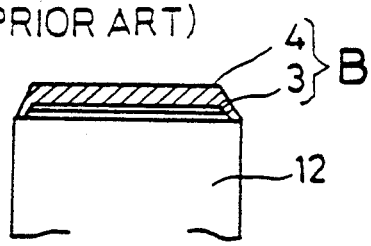
Fig. 9 (II) (PRIOR ART)
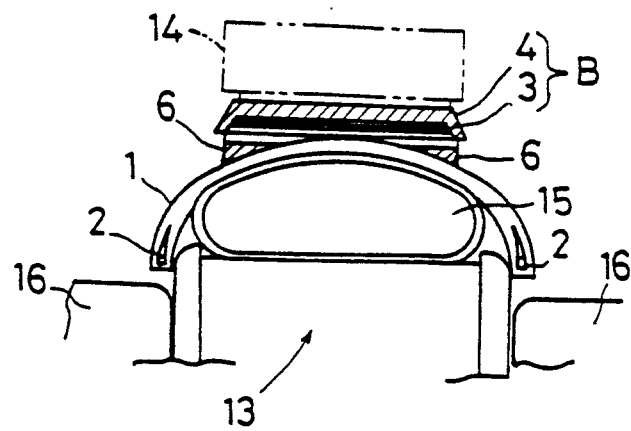
Fig. 11 (PRIOR ART)
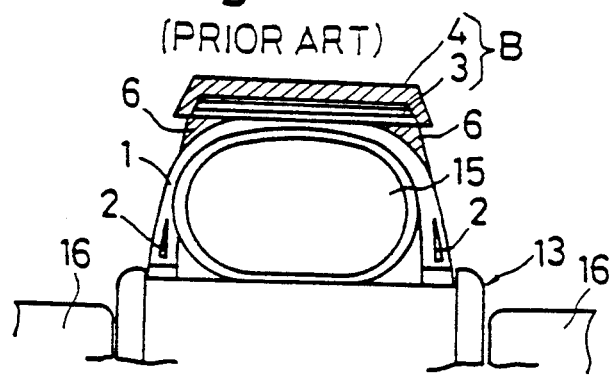
Fig. 12 (PRIOR ART)
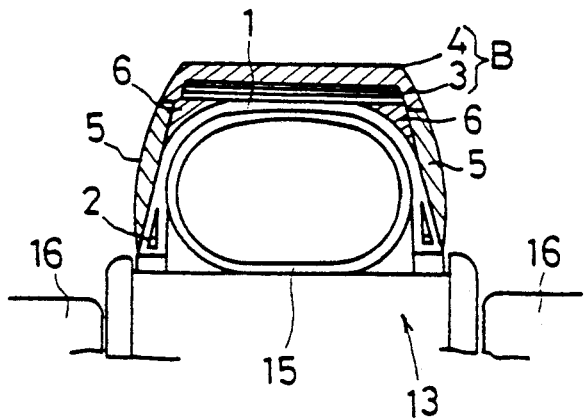
Fig. 13 (PRIOR ART)

Fig. 10 (I)
(PRIOR ART)
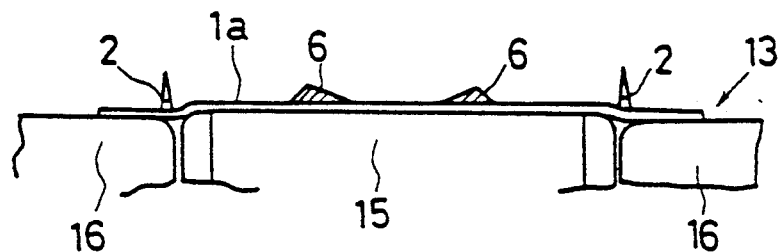
Fig. 10 (II)
(PRIOR ART)
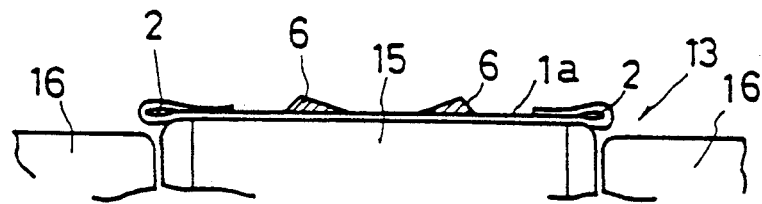
Fig. 10 (III)
(PRIOR ART)
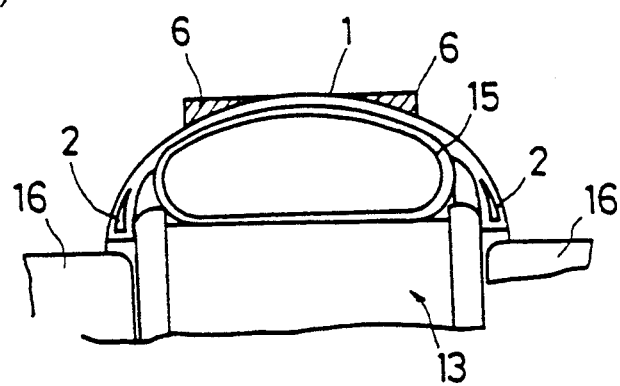

PROCESS FOR ASSEMBLING A GREEN TIRE

FIELD OF THE INVENTION AND RELATED ART STATEMENT

The present invention relates to a process for assembling green tires and a belt drum for practicing the process.

DESCRIPTION OF THE BACKGROUND ART

FIG. 7 shows a tire T for motor vehicles which is generally known and which comprises a carcass 1 having beads 2 within the respective opposed ends along its inner periphery, a tread 4 provided over the outer periphery of the carcass 1 with a breaker 3 interposed therebetween, sidewalls 5 provided on opposite side faces of the carcass 1, and a breaker cushion 6 embedded between the carcass 1 and opposite each edge portion of the breaker 3. When the breaker 3 which is in the form of a hollow cylinder is adhered to the toroidal carcass 1 to form a green tire, a space or clearance occurs towards the edges of the breaker and the breaker cushions 6 are positioned on the carcass 1 to fill the space so the breaker 3 may have the desired cylindrical form.

FIG. 8 shows an example of an apparatus for building such a green tire. The apparatus comprises headstocks 8, 9 mounted on the respective ends of a base 7 and having a common horizontal axis, a belt drum 12 and a tire carcass building drum 13 which are both radially expandable and contractible and which are rotatably supported, each at one end, respectively by rotary shafts 10, 11 on the headstocks 8, 9. Belt transport means 14 are provided which can be moved between the two drums 12, 13. The tire carcass building drum 13 comprises a drum body composed of a plurality of drum segments divided circumferentially thereof, an annular inflatable shaping bladder 15 around the drum body, and inflatable side bladders 16 arranged on respective axially opposite sides of the forming bladder 15. The belt drum 12 is in the form of a hollow cylinder comprising a plurality of drum segments divided circumferentially thereof and radially expandable and contractible.

The process illustrated in the FIGS. 9 to 13 is already known as a process for building green tires. With reference to FIG. 9, a belt B comprising a breaker 3 and a tread 4 is formed using the apparatus shown in FIG. 8 as now follows. The breaker is wound in on one or a plurality of layers around the belt drum 12 in its radially expanded condition (FIG. 9 (I)). The tread 4 is wound around and adhered to the breaker 3 (FIG. 9 (II)) to form the belt B in the shape of a hollow cylinder. The drum 12 is then radially contracted, and the belt B is taken from the drum by means of the belt transport means 14, which is then placed in a stand-by position.

The tire carcass building drum 13 is radially contracted and then a tire carcass component material 1a is wound around the shaping bladder 15 and the side bladders 16 to form a cylindrical tube. A pair of beads 2 and a pair of breaker cushions 6 are fitted one to the tube in the positions shown in FIG. 10 (I). Next, as shown in FIG. 10 (II), the belt building drum 12 is slightly expanded to engage and lock the beads 2. The side bladders 16 are then inflated to fold the carcass material 1a around the beads 2, and the shaping bladder 15 is thereafter inflated to shape the carcass 1 into a toroidal shape as seen in FIG. 10 (III).

Subsequently, the waiting transport means 14 is moved to position the belt B around the outer periphery of the carcass 1 as shown in FIG. 11, the shaping bladder is then slightly inflated to fixedly position the belt B on the carcass 1 in the required position, and the transport means 14 is retracted. The forming bladder 15 is thereafter further inflated to intimately fit together the carcass 1, the breaker 3 and the breaker cushions 6 as seen in FIG. 12. As seen in FIG. 13, sidewalls 5 are adhered to the respective side faces of the carcass 1, and the shaping bladder 15 and the building drum 13 are contracted to allow removal of the completed green tire from the apparatus. The green tire thus formed is subjected to heat and pressure in a vulcanising press to bond the components together and mold the completed tire with its tread pattern.

With the conventional green tire assembly process described, the breaker cushions 6 are affixed to the carcass 1 in the form of a hollow cylinder, which is thereafter radially expanded to the final toroidal shape. This makes it extremely difficult to form the breaker cushions 6 of the required configuration in the finished tire. Also it is impossible to embed position the breaker 3 in the tire structure with its desired cylindrical shape with any real degree of accuracy. These difficulties lead to variations in the tire which have an adverse effect on tire uniformity and impair durability in service.

OBJECT AND SUMMARY OF THE INVENTION

An object of the present invention is to provide a green tire building process and a belt drum which position the breaker with high accuracy.

Specifically, the present invention provides a green tire building process wherein a cylindrical belt comprising a tread and a breaker and sidewalls are applied around a toroidally shaped tire carcass on a tire carcass building drum to assemble a green tire characterised by fitting breaker cushions to the inner circumferential surfaces of the opposite edge portions of the breaker prior to applying the belt around the tire carcass. In the step of winding the breaker cushions, each of the breaker cushions is wound around the belt forming drum so as to make the inner peripheral surface of the cushion curved or tapered to suit the toroidal shape it has in the completed tire and to make the outer periphery thereof substantially straight-surfaced, so that the breaker may be fitted to the cushions with its correct shape.

By means of the present invention, the breaker cushions are initially made and retain a diameter to substantially that of the final product and are not radially enlarged or deformed unlike those of the prior art. The result is that the breaker can be positioned in the tire structure axially of the tire in a cylindrical form with high accuracy. This ensures good tire uniformity and gives improved durability to the tire.

The present invention further provides a belt building drum which is characterized in that the drum is formed at each of its axially opposite ends with a portion for winding a breaker cushions therearound, and this portion is so shaped as to have a diameter decreasing toward the axially outer extremity thereof.

In one arrangement the portion of decreasing diameter has in cross section a tapered surface or profile. It may alternatively be of curved cross sectional profile.

Thus, the belt drum of the invention is so shaped that the axially opposite end portions of its outer periphery have a diameter decreasing towards the outer extremlities. Accordingly, the breaker cushions can be affixed to the respective end portions of inner periphery of the breaker readily, properly and accurately. This permits the breaker to retain its shaped and axial position to result in improved formability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 (I) to (IV) also illustrate a belt forming step;

FIG. 3 (I) to (III) show a carcass forming step;

FIG. 6 shows sidewalls as affixed to the carcass;

FIG. 8 to FIG. 13 show a conventional prior art example;

FIG. 8 is a front view schematically showing a green tire forming apparatus;

FIG. 9 (I) to (II) illustrate a belt forming step;

FIG. 10 (I) to (III) illustrate a carcass forming step;

FIG. 11 illustrates a belt as fitted around a carcass;

FIG. 12 illustrates the belt as fitted around to the carcass; and

FIG. 13 shows sidewalls as affixed to the carcass.

DESCRIPTION OF THE PREFERRED EMBODIMENT

Figure 1:
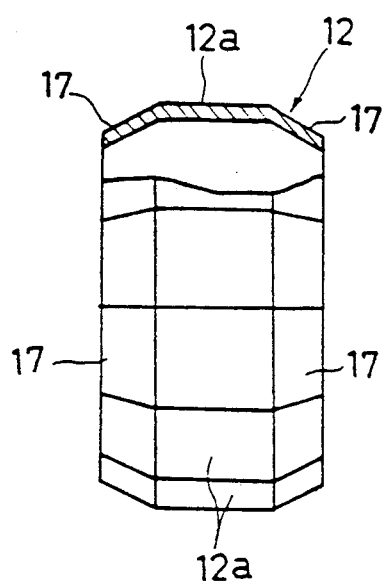
FIG. 1 is a front view partially broken away and showing a belt forming drum.

An embodiment of the present invention will be described below with reference to the drawings concerned, i.e., FIG. 1 to FIG. 8.

Since the structure of the tire and the basic construction of the forming apparatus are the same as those of the prior art shown in FIG. 7 to FIG. 13, like parts are designated by like reference numerals.

FIG. 1 shows a belt drum 12 comprising segments 12a each having at its opposite ends an outer surface slanting radially inwardly of the drum. Thus, the drum 12 is formed at each of its axially opposite ends with an outer peripheral tapered surface 17 having a diameter decreasing toward its outer edges. Each tapered surface 17 provides a breaker cushions supporting surface and the assembly is such that when the drum 12 is radially expanded, the outer periphery of the mid-portion of the drum 12 is level with the outer peripheral surface 6a of the breaker cushion 6 as fitted around the tapered surface 17. Thus, the breaker cushion 6 can be accurately positioned by placing it on its respective tapered surface 17. Thus by using the belt forming drum 12 of the invention a belt B can be formed in which the breaker cushions 6 are affixed to the respective opposite edge portions of the inner periphery of the breaker 3.

The belt B is formed by the procedure to be described below with reference to FIG. 2(I) to (IV). First, as shown in FIG. 2(I), breaker cushions 6, which are prepared in advance by extrusion in the form of a ring of triangular cross section, are positioned around each tapered surface 17 of the belt forming drum 12 is radially contracted. The breaker cushions 6 have a generally flat surface 6a. The drum 12 is then radially expanded to engage both cushions 6 on the tapered surface 17. Next a breaker 3 is wound around and affixed to the drum 12 as shown in FIG. 2(II) so that it flat surfaces 6a over both cushions 6. Then as shown in FIG. 2(III), a tread 4 is wound around and affixed to the outer periphery of the breaker 3 to complete the subassembly of the belt B. Subsequently, the belt transport means 14 takes hold of the belt B, the belt drum 12 is contracted, and the transport means 14 is moved towards the tire carcass building drum 13 to a stand-by position where it meets the holding belt B.

To build a carcass 1, on the other hand, a liner and carcass ply sheet materials 1a are wrapped around and affixed to the drum 13 in its radially contracted condition to form a hollow cylindrical tube, and a pair of preassembled beads 2 already fitted with apexes are fitted over the tube each positioned as seen in FIG. 3(I). The building drum 13 is slightly increased in diameter to lock in place the beads 2 and the side bladders 16 are inflated to fold the liner and ply material 1a around the beads as shown in FIG. 3(II). The forming bladder 15 is thereafter inflated as seen in FIG. 3(III), whereby the carcass 1 is formed into a toroidal shape.

Figure 4:
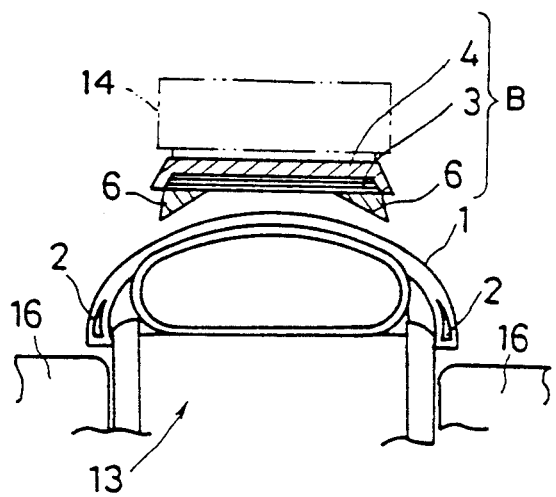
FIG. 4 shows a carcass and a belt.
Figure 5:
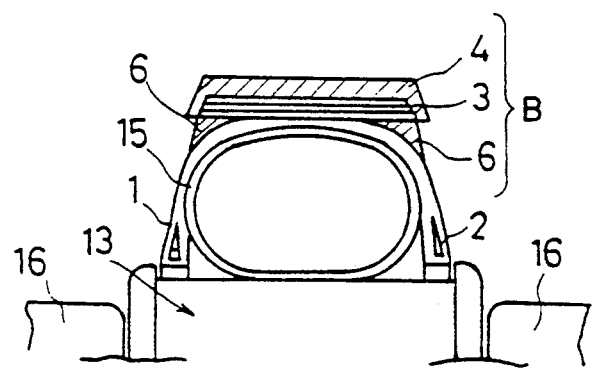
FIG. 5 shows the belt as fitted around the carcass in intimate contact therewith.

The belt transport means 14 is then moved from the stand-by position to place the belt B around the carcass 1 as shown in FIG. 4 with an accurately set relative axial arrangement. The shaping bladder 15 is slightly inflated to engage the belt B in position on the carcass 1, the transport means 14 is retracted towards the belt forming drum 12, and the forming bladder 15 is further inflated to bring the carcass 1 into full intimate contact with the breaker 3 and the breaker cushions 6 as shown in FIG. 5. A sidewall 5 is fitted to each opposite side face of the carcass 1 as shown in FIG. 6, the shaping bladder 15 is contracted, the drum 13 is radially contracted, and the resulting green tire assembly is removed from the drum 13. The green tire thus formed is later cured in a mould under heat and pressured to bond and cure the components and complete a tire having a tread pattern.

Figure 7:
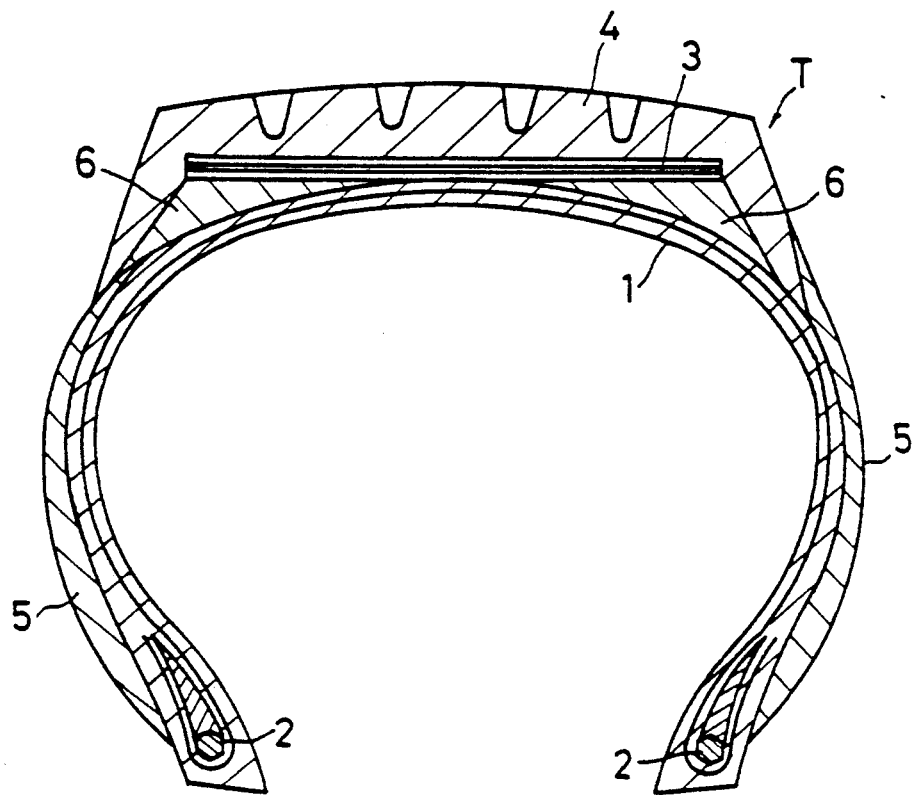
FIG. 7 is a sectional view of a tire.
Figure 8:
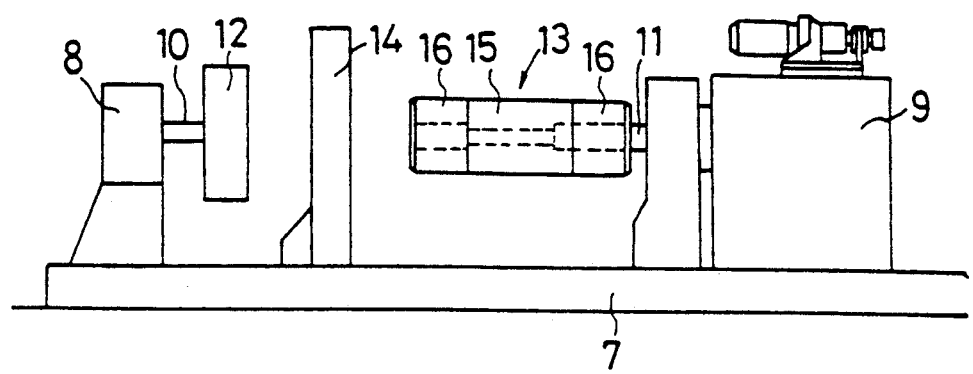

Although the sidewalls 5 are fitted over the outer side of the tread 4 according to the above embodiment as shown in the right half of FIG. 7, the tread 4 can alternatively be fitted over the outer side of the sidewall 5 as shown in the left half of FIG. 7. In this case, the sidewall 5 is affixed to each of the opposite side faces of the carcass 1 as formed in the toroidal shape, and the belt B is thereafter fitted around and affixed to the carcass 1. Thus, the invention can be applied to either sidewall over tread or tread over sidewall tire construction.

The invention provides an effective method of assembling a tire and a particular belt drum for said method which allows the breaker to have a predetermined substantially flat shape and provides for cushions to be used at the belt edges. The method and apparatus allow great precision in component assembly, substantially eliminate changes of diameter and cross section of the cushions and provide tires of improved accuracy, uniformity and structural integrity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A green tire building process comprising the steps of:

forming a belt made up of a tread, a breaker, and a plurality of breaker cushions, and having a hollow, generally cylindrical shape, the step of forming comprising, winding the plurality of breaker cushions around axial end portions of a belt forming drum, each of the breaker cushions having a generally curved or tapered radially inner peripheral surface and a generally flat radially outer peripheral surface along the axial direction after being wound around the belt forming drum, the inner peripheral surfaces being so shaped as to have a decreasing diameter towards the axially outer extremities of the drum, winding the breaker around the belt forming drum after the step of winding the breaker cushions, the breaker covering the breaker cushions, and winding the tread around the breaker after the step of winding the breaker around the belt forming drum;

removing the belt from the belt forming drum; and fitting the belt around a carcass preformed in a toroidal shape on a tire building drum, the inner peripheral surface of the breaker cushions matching the toroidal shape of the carcass.

2. The green tire building process as defined in claim 1, comprising the step of using two annular breaker cushions as the breaker cushions, each breaker cushion having generally a triangular cross section.

3. The green tire building process as defined in claim 1, wherein the belt forming drum is radially contractible and expandable and wherein the process further comprises the steps of contracting the belt forming drum before the breaker cushions are placed thereon, then expanding the belt forming drum to engage all of the breaker cushions and then contracting the belt forming drum after the tread is wound on around the breaker on the breaker cushions.

4. The green tire building process as defined in claim 3, wherein the step of removing the belt from the belt forming drum occurs after the belt forming drum is contracted after the tread is wound therearound, and wherein the tire building drum is contractible and expandable, the belt being fit around the carcass after expansion of the tire building drum.

5. The green tire building process as defined in claim 1, wherein the tire building drum is contractible and expandable and wherein the process further comprises the steps of placing a liner and carcass ply sheet materials around the tire building drum to form a hollow, generally cylindrical tube, placing beads over the tube and then expanding the tire building drum to lock the beads in place.

6. The green tire building process as defined in claim 5, wherein the tire building drum has inflatable bladders on each wide thereof, the process further comprises the step of inflating the bladders after the beads are placed over the tube to thereby fold the liner and ply sheet materials around the beads.

7. The green tire building process as defined in claim 6, further comprising the step of further expanding the tire building drum after the step of inflating the bladders such that the carcass takes on the toroidal shape, the belt is placed on the carcass after the carcass has the toroidal shape.

8. The green tire building process as defined in claim 7, further comprising the steps of:

further expanding the tire building drum after the belt is placed on the carcass to thereby engage the belt and carcass;

continuing expanding of the tire building drum to ensure full intimate contact with the breaker and the breaker cushions;

fitting a sidewall to each opposed side of the carcass after the breaker and breaker cushions are in full, intimate contact, the belt, the carcass and the sidewall forming the green tire; and contracting the tire building machine and removing the green tire therefrom.

9. The green tire building process as defined in claim 1, further comprising the step of fitting a sidewall to each opposed side of the carcass after the step of fitting the belt around the carcass.

* * * * *